F. L. Roberts.
Churn.

Nº 96,967.     Patented Nov. 16. 1869.

Witnesses:
Wm W. Kinleyh
Geo. E. Baldwin

Inventor:
Frank L. Roberts,
By Jb. Abbott, Attorney.

United States Patent Office.

FRANK L. ROBERTS, OF JACKSONVILLE, ASSIGNOR TO JAMES M. McPHERSON, OF RIPLEY, ILLINOIS.

Letters Patent No. 96,967, dated November 16, 1869.

IMPROVEMENT IN CHURNS.

The Schedule referred to in these Letters Patent and making part of the same.

*To all whom it may concern:*

Be it known that I, FRANK L. ROBERTS, of Jacksonville, in the county of Morgan, and State of Illinois, have invented new and useful Improvements in Churns; and I do hereby declare that the following is a full, clear, and exact description of my invention, reference being had to the accompanying drawings, forming a part of this specification, and to the letters of reference marked thereon, of which drawings—

The nature of my invention consists in constructing a churn-dasher with a horizontal rim and a conical-shaped cavity in the centre, which is used in combination with a churn-box, having a cone-shaped body on its bottom, whereby I obtain all the violent agitation of the cream due to the vertical movement of the horizontal rim of the dasher, the same as in the movement of a dasher composed simply of a horizontal disk, and, at the same time, secure the additional useful effect due to the admixture of the air, which is brought down in the conical cavity, and expelled by the conical expelling-block, at each stroke of the dasher, thus greatly facilitating the operation of churning.

To enable others skilled in the art to make and use my invention, I will proceed to describe its construction and operation.

In the annexed drawings—

A represents the churn-box, which can be conveniently made of tin, in the cylindrical form shown, although other material, such as wood or stone-ware, and other forms of boxes, such as a prismatic or rectangular box, could be used if desired.

The cover B is made with the rim D, which fits around the box A as shown, and a hole is made in said cover, in which the dasher-rod C is free to move up and down.

The dasher F is composed of the collar N, by which it is secured to the dasher-rod C, and the body F, which has the interior conical cavity L, and the holes H H, and has the dash-rim K (provided with holes *k k*) secured at its lower edge, as shown.

The expelling-block G is secured on the bottom of the box A, directly under the cavity L of the dasher F, and may be made of wood, tin, or any suitable material, and secured on the bottom of the box A in any desired manner.

The dasher F and block G are most conveniently made of tin or wood, but other material can be used if desired.

The expelling-block G may be of the conical form shown, or, if preferred, can be made in the form of a pyramid, sugar-loaf, or semisphere, the cavity L of the dasher being made to conform in size and shape to the block G.

Figure 1:
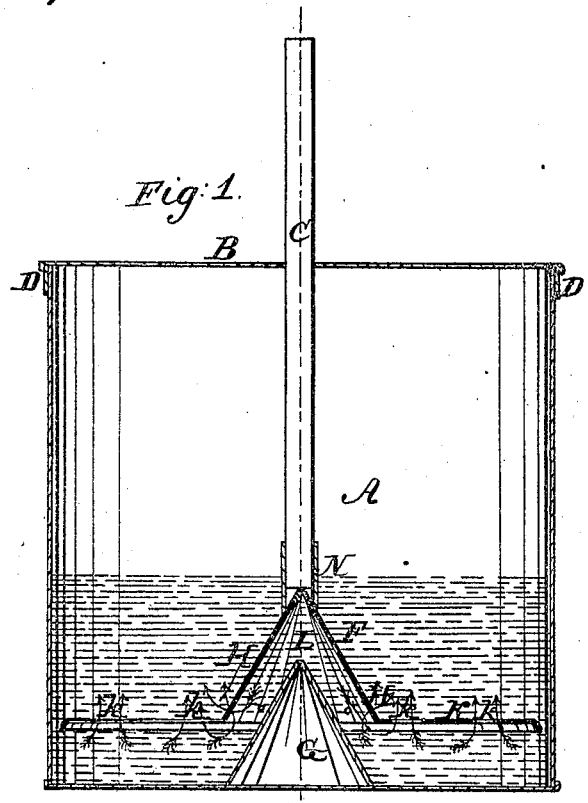
Figure 1 is a sectional elevation of my improved churn.
Figure 2:
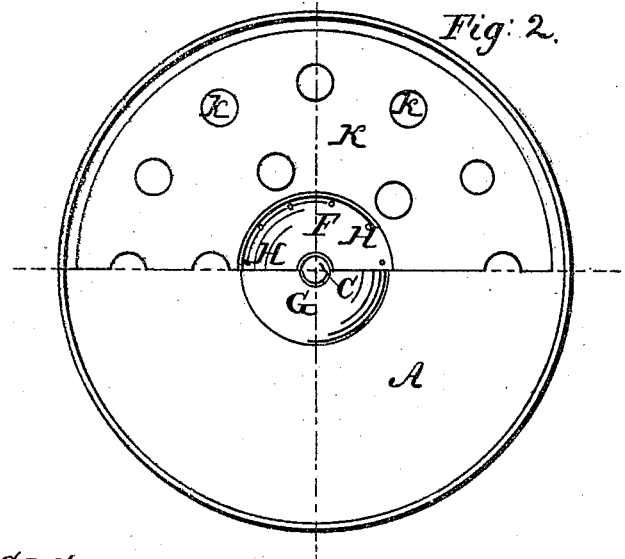
Figure 2 is a plan of churn-box, and half plan of dasher, in position in said box.

The position of the several parts, when the churn is in operation, is seen in fig. 1, where the dotted lines represent the cream in the churn.

It is readily seen that by imparting an up-and-down movement to the dasher F, by means of the rod C, said dasher can be raised above the surface of the cream, and the cavity L filled with air, and that the downward movement of the dasher will then cause the cream to be forced through the holes H H *k k*, as indicated by black arrows, while the air will be forced out of the cavity L through the cream, as indicated by red arrows, by reason of the block G entering the cavity L, and displacing the air contained therein.

It is also evident that this churn is of very cheap construction, and that it can be kept clean and sweet with but little labor.

Having thus fully described my invention, I wish here to state that I am aware that air has been before mixed with the cream, during the process of churning; hence I lay no claim to that principle. And I am also aware that churn-dashers have been before constructed, in which the whole dasher was of a cone-shape, and acted in combination with a churn-box with a conical bottom; but I lay no claim to such a dasher and churn-box, which are much inferior to mine in operation, as, by making the whole of the dasher in a cone-shape, the cream is struck by an oblique surface, and much of the useful effect due to the direct impact of the horizontal dasher, in breaking the globules of the cream, is thereby lost; but

What I claim herein as new, and desire to secure by Letters Patent is—

The churn-dasher F K, consisting of the horizontal rim K, with holes *k k*, and the hollow cone F, with holes H H, when used in combination with the churn-box A, provided with the expelling-block G, substantially as and for the purpose specified.

As evidence that I claim the foregoing, I have hereunto set my hand, in the presence of two witnesses, this 23d day of June, 1869.

F. L. ROBERTS.

Witnesses:
JOSEPH W. WHORTEN,
J. M. McPHERSON.